United States Patent
Hsu et al.

(10) Patent No.: US 12,491,158 B2
(45) Date of Patent: Dec. 9, 2025

(54) LIPOSOME COMPOSITION AND PREPARATION METHOD THEREOF

(71) Applicant: Chung Yuan Christian University, Taoyuan (TW)

(72) Inventors: Yih-Chih Hsu, Taoyuan (TW); Eka Putra Gusti Ngurah Putu, Taoyuan (TW)

(73) Assignee: Chung Yuan Christian University, Taoyuan (TW)

( * ) Notice: Subject to any disclaimer, the term of this patent is extended or adjusted under 35 U.S.C. 154(b) by 827 days.

(21) Appl. No.: 17/742,418

(22) Filed: May 12, 2022

(65) Prior Publication Data

US 2022/0296520 A1   Sep. 22, 2022

Related U.S. Application Data

(63) Continuation-in-part of application No. PCT/US2021/021605, filed on Mar. 10, 2021.

(60) Provisional application No. 62/987,366, filed on Mar. 10, 2020.

(51) Int. Cl.
  *A61K 9/1277*  (2025.01)
  *A61K 9/1273*  (2025.01)
  *A61K 33/243*  (2019.01)

(52) U.S. Cl.
  CPC .......... *A61K 9/1277* (2013.01); *A61K 9/1273* (2013.01); *A61K 33/243* (2019.01)

(58) Field of Classification Search
  CPC .. A61K 9/1277; A61K 9/1273; A61K 33/243; A61K 9/1271
  See application file for complete search history.

(56) References Cited

U.S. PATENT DOCUMENTS

2013/0011466 A1*  1/2013  Hirai .................. A61P 35/00
                                                         424/649
2019/0269635 A1*  9/2019  Nikoulin ............. A61K 9/10

FOREIGN PATENT DOCUMENTS

| CN | 105209017 A | 12/2015 |
| JP | 2019504121 A | 2/2019 |
| WO | 2008072584 A1 | 6/2008 |
| WO | 2009148169 A1 | 12/2009 |

OTHER PUBLICATIONS

Dasari et al. (Cisplatin in cancer therapy: Molecular mechanisms of action, Jul. 21, 2014, European Journal of Pharmacology, 740, 364-378) (Year: 2014).*

Examination report dated Jun. 30, 2022, listed in correspondent Taiwan patent application No. 110134714.

Extended search report report dated Dec. 21, 2023, listed in correspondent Europe patent application No. 21766967.0 (publication No. EP 4117686).

Mary S. Newman et al., Comparative Pharmacokinetics, Tissue Distribution and Therapeutic Effectiveness of Cisplatin Encapsulated in Long-Circulating, Pegylated Liposomes (SPI-077) in Tumor-Bearing Mice, Cancer Chemotherapy and Pharmacology, Springer Verlag, Berlin, DE, vol. 43, Jan. 1, 1999 (Jan. 1, 1999), pp. 1-07, XP001018172, ISSN: 0344-5704, DOI: 10.1007/S002800050855.

Examination report dated Feb. 25, 2025, listed in correspondent Japan patent application No. 2022-554389 (publication No. 2023-519175).

* cited by examiner

*Primary Examiner* — Frederick F Krass
*Assistant Examiner* — Abdulrahman Abbas
(74) *Attorney, Agent, or Firm* — Chieh-Mei Wang

(57) ABSTRACT

The present disclosure provides methods for preparing a liposome composition. One of the methods includes the steps of: providing precursor liposomes encapsulating platinum-based precursors; and incubating the precursor liposomes with a salt solution to convert the platinum-based precursors to platinum-based drugs to form the liposome composition. The precursor liposomes are prepared by step of: hydrating the platinum-based drugs to form the platinum-based precursors; and adding the platinum-based precursors to a lipid bilayer vehicle to form the precursor liposomes. The liposome composition prepared by the methods shows improved encapsulation efficiency and enhanced drug loading capacity.

14 Claims, 15 Drawing Sheets

| | Cmax (µg/mL) | CL (mL/hr) | Vz (mL) | Vss (mL) | AUC_last (µg·hr/mL) | AUC_INF (µg·hr/mL) | Half-life (hr) | MRT_last (hr) | MRT_INF (hr) | Rsq |
|---|---|---|---|---|---|---|---|---|---|---|
| CDDP (control) | 109.2 | 6.88 | 49.44 | 396.8 | 194.71 | 218.72 | 50.56 | 39.10 | 58.54 | >0.94 |
| Total CDDP | 106.03 | 1.02 | 122.61 | 113.0 | 747.73 | 885.64 | 52.03 | 42.28 | 70.09 | >0.96 |
| Liposomal CDDP | 60.12 | 2.12 | 338.94 | 282.6 | 450.94 | 895.75 | 115.94 | 46.64 | 139.97 | >0.93 |
| Released CDDP | 54.06 | 0.00 | 0.22 | 0.25 | 402.96 | 463.59 | 50.82 | 54.88 | 82.29 | >0.92 |

FIG. 7B

| | Cmax (ug/mL) | CL (mL/hr) | Vz (mL) | Vss (mL) | AUC (ug-hr/mL) | AUC_last (ug-hr/mL) | AUC_INF (ug-hr/mL) | Half-life (hr) | MRT (hr) | MRT_last (hr) | MRT_INF (hr) | Rsq |
|---|---|---|---|---|---|---|---|---|---|---|---|---|
| Total CDDP | 9.9 | 0.067 | 8.8 | 8.0 | NA | 327.714 | 468.946 | 94.14 | NA | 51.340 | 120.543 | >0.94 |
| Liposomal CDDP | 11.3 | 0.057 | 7.9 | 7.7 | NA | 350.573 | 537.70 | 97.79 | NA | 55.493 | 136.9 | >0.95 |
| Released CDDP | 6.8 | 0.074 | 23.5 | 23.0 | NA | 213.756 | 529.76 | 200.53 | NA | 70.711 | 291.3 | >0.70 |

LIPOSOME COMPOSITION AND PREPARATION METHOD THEREOF

REFERENCE TO RELATED APPLICATION

The present application is a continuation-in-part of international application No. PCT/US21/21605, filed on Mar. 10, 2021, which claims the priority of U.S. provisional application No. 62/987,366, filed on Mar. 10, 2020, the entirety of which are incorporated herein by reference.

BACKGROUND

Technical Field

The present disclosure relates to a liposome composition, and more particularly to a liposome composition encapsulating a platinum-based precursor and a method for preparing the same.

Related Art cis-diaminedichloroplatinum (II) (CDDP, cis-[Pt(NH$_3$)$_2$(Cl)$_2$], also known as cisplatin) has been commonly used as a chemotherapeutic agent. However, it is poorly water soluble, and its high toxicity is known to cause various undesirable side effects.

SUMMARY

To improve solubility and reduce toxicity of CDDP, an embodiment of the present disclosure provides a method for preparing a liposome composition. The method comprises the steps of: providing precursor liposomes encapsulating platinum-based precursors; and incubating the precursor liposomes with a salt solution to convert the platinum-based precursors to platinum-based drugs to form the liposome composition.

Another embodiment of the present disclosure provides a method for preparing the liposome composition. The method comprises the steps of: providing salt liposomes encapsulating salts; and mixing the salt liposomes with platinum-based precursors to allow the platinum-based precursors to enter the salt liposomes and interact with the salts so as to convert the platinum-based precursors to platinum-based drugs to form the liposome composition.

Yet another embodiment of the present disclosure provides a method for preparing the liposome composition. The method comprises the steps of: providing precursor liposomes encapsulating platinum-based precursors, and providing salt liposomes encapsulating salts; and mixing the precursor liposomes and the salt liposomes to convert the platinum-based precursors to platinum-based drugs to form the liposome composition.

Still another embodiment of the present disclosure provides a method for preparing the liposome composition. The method comprises the steps of: providing precursor cores encapsulating platinum-based precursors, and providing salt cores encapsulating salts; mixing the precursor cores and the salt cores to convert the platinum-based precursors to platinum-based drugs to form a liposome core; and mixing the liposome core with a first lipid-based formulation to form the liposome composition.

Yet still another embodiment of the present disclosure provides a liposome composition. The liposome composition is prepared by any of the methods mentioned above. Drug loading of the liposome composition is at least 10%.

According to the embodiments of the present disclosure, the liposome composition provides an effective solution to improving platinum-based drug solubility and encapsulation efficiency by liposomal particles. By using the methods of the embodiments of the present disclosure, the precursor liposomes can be converted to platinum-based drug encapsulating liposomes with ease and at low cost. The methods also provide an effective tool for enhancing drug loading of liposome compositions.

BRIEF DESCRIPTION OF THE DRAWINGS

The disclosure will become more fully understood from the detailed description given herein below for illustration only, and thus not limitative of the disclosure.

FIGS. 7A and 7B show results of pharmacokinetic analysis of the liposome composition in a rat model according to an exemplary embodiment of the present disclosure;

FIGS. 8A and 8B show results of pharmacokinetic analysis of the liposome composition in a dog model according to an exemplary embodiment of the present disclosure;

DETAILED DESCRIPTION

Figure 1A:
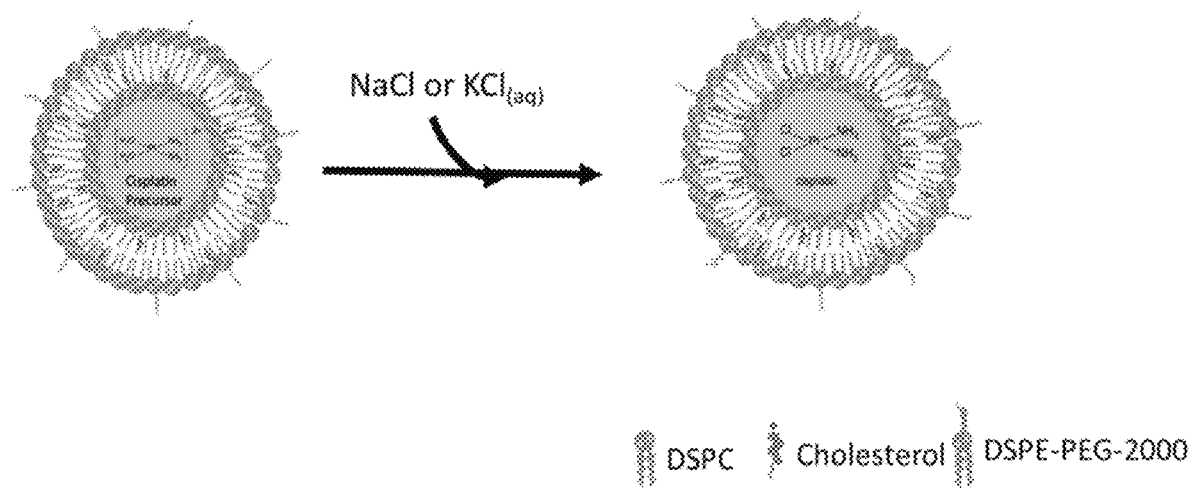
FIG. 1A illustrates a schematic diagram of a preparation of a liposome composition according to an exemplary embodiment of the present disclosure.
Figure 1B:
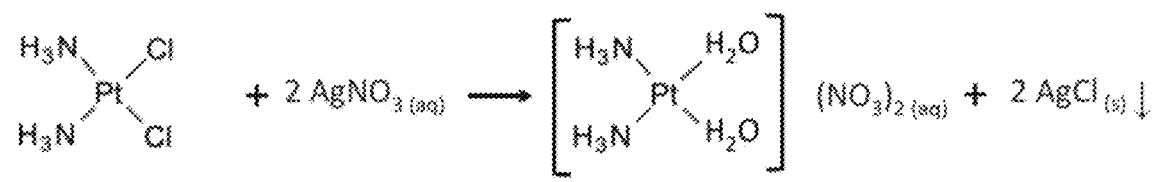
FIG. 1B illustrates a preparation of a CDDP precursor of the liposome composition according to an exemplary embodiment of the present disclosure.

Referring to FIGS. 1A and 1B. In a first embodiment of the present disclosure, a method for preparing a liposome composition is provided. The method may include the steps of: providing precursor liposomes encapsulating platinum-based precursors; and incubating the precursor liposomes in a salt solution to convert the platinum-based precursors to platinum-based drugs to form the liposome composition. Specifically, the precursor liposomes may be prepared by the steps of: hydrating the platinum-based drugs to form the platinum-based precursors; and adding the platinum-based precursors to a lipid bilayer vehicle to form the precursor liposomes.

In the present disclosure, the term "liposomes" refers to spherical vesicles formed by at least two phospholipid layers (i.e., at least one lipid bilayer) and capable of enclosing or encapsulating one or more compounds of interest, thereby acting as vehicles for delivery of the compounds to a target site. The term "precursor liposomes" refers to liposomes that enclose or encapsulate precursors of the compounds of interest (e.g., platinum-based precursors of platinum-based drugs) in an aqueous solution. The term "drug" may encompass any therapeutic compounds, including active pharmaceutical ingredients, such as chemotherapeutic agents (e.g., CDDP).

As illustrated in FIG. 1B, to form the platinum-based precursors, the platinum-based drugs may be hydrated by incubating the platinum-based drugs with silver nitrate ($AgNO_3$), silver sulfate ($Ag_2SO_4$), silver phosphate ($Ag_3PO_4$), calcium nitrate ($Ca(NO_3)_2$), calcium sulfate ($CaSO_4$), calcium phosphate ($Ca_3(PO_4)_2$), magnesium nitrate ($Mg(NO_3)_2$), magnesium sulfate ($MgSO_4$), and/or magnesium phosphate ($MgHPO_4$).

In an embodiment, the platinum-based drugs may include at least one platinum-halides bond (e.g., Pt—F, Pt—Cl, Pt—Br, or Pt—I bonds). Some examples of the platinum-based drugs may include cisplatin, triplatin, phenanthriplatin, picoplatin, satraplatin, cis-diammine diiodo platinum (II), cis-diammine difluoro platinum (II), and cis-diammine dibromo platinum (II).

The platinum-based precursors may be monoaqua and/or diaqua forms of the platinum-based drugs; for example, cis-$[Pt(NH_3)_2(H_2O)_2](NO_3)_2$ or cis-$[Pt(NH_3)_2(H_2O)_2]^{2+}$. The platinum-based precursors may be encapsulated into the lipid bilayer vehicle (e.g., liposomal nanoparticles) due to their water-soluble nature, thereby forming the precursor liposomes.

The lipid bilayer vehicle may be prepared by mixing a lipid-based formulation in an organic solvent, such as chloroform, cyclohexane, methanol, ethanol, or any combination thereof. The lipid-based formulation may include a combination of phosphatidylcholine, cholesterol, and (methoxy)polyethyleneglycol ((m)PEG)-conjugated phospholipid. The mole ratio of phosphatidylcholine, cholesterol, and (m)PEG-conjugated phospholipid may fall within the range of 5-15:5-15:0.5-10. Preferably, the phosphatidylcholine may include, but is not limited to, neutral lipids, such as 1,2-distearoyl-sn-glycero-3-phosphocholine (DSPC), 1,2-dioleoyl-sn-glycero-3-phosphocholine (DOPC), 1,2-dipalmitoyl-sn-glycero-3-phosphocholine (DPPC), 1,2-dilauroyl-sn-glycero-3-phosphocholine (DLPC), 1,2-dimyristoyl-sn-glycero-3-phosphocholine (DMPC), hexadecyl phosphorylcholine (HePC), 1-stearoyl-2-oleoyl-sn-glycero-3-phosphocholine (SOPC), 1,2-diphytanoyl-sn-glycero-3-phosphocholine (diPhyPC), hydrogenated soybean phosphatidylcholine (HSPC), or any combination thereof. The (m)PEG-conjugated phospholipid includes a (m)PEG moiety and a phospholipid moiety. Specifically, the phospholipid moiety may include, but is not limited to, phosphoethanolamine lipids (e.g., 1,2-distearoyl-sn-glycero-3-phosphoethanolamine (DSPE) and 1,2-dipalmitoyl-sn-glycero-3-phosphoethanolamine (DPPE)). The (m)PEG moiety may include PEG (polyethyleneglycol) or mPEG (methoxypolyethyleneglycol) having a chain length ranging from 100 to 10000. In other words, the (m)PEG-conjugated phospholipid may include, but is not limited to, mPEG-200, mPEG-350, mPEG-400, mPEG-550, mPEG-750, mPEG-800, mPEG-1000, mPEG-2000, mPEG-2500, mPEG-3000, mPEG-4000, mPEG-5000, mPEG-6000, mPEG-10000, or any combination thereof. In a preferred embodiment, the (m)PEG-conjugated phospholipid may be DSPE-mPEG-2000. In some embodiments, the (m)PEG-conjugated phospholipids may further be conjugated with other ligand moieties, such as aminoethyl anisamide (AEAA) or monoclonal antibodies (mAb).

The lipid-based formulation may be self-assembled in an aqueous environment via hydrophobic interaction and/or van der Waals interaction to form the lipid bilayer vehicle. In one or more preferred embodiments, neutrality of the lipid-based formulation provides minimum energy bonding to the encapsulated active pharmaceutical ingredients (API) or precursors thereof, therefore facilitating drug release in vivo. Furthermore, as the neutral lipid bilayer vehicle does not interact with the charged precursors, drug conversion occurred therein would not be affected or hindered.

In the embodiment, the mole ratio of the platinum-based drugs to lipid bilayer vehicle in the liposome composition may fall within the range of 0.25-1.2:1. The CDDP precursors may be added to the lipid bilayer vehicle at an oil to water (v/v) ratio of 1.5-50:1-4; that is, the volume ratio of the lipid bilayer vehicle to the CDDP precursors may fall within the range of 1.5-50:1-4. The concentration of the platinum-based precursors added to the lipid bilayer vehicle or in the resulting precursor liposomes may fall within a range of 10 mM to 600 mM, preferably 1.5 mM to 5 mM.

To convert the platinum-based drugs from the platinum-based precursors, the precursor liposomes may be incubated in the salt solution to allow the salts to enter the precursor liposomes. In the embodiment, the salt solution may include fluoride, chloride, bromide, iodide, or other salts of the halogen group. A concentration of the salt solution may fall within a range of 0.1 M to 4 M; more specifically, when NaCl is used for the conversion, the concentration of NaCl may fall within a range of 0.1 M to 3.9 M; when KCl is used, the concentration of KCl may fall within a range of 0.4 M to 3.0 M. In an example, the incubation may be carried out at 4-80° C. for 1-48 h to allow the salts to enter the precursor liposomes and convert CDDPs from diaqua CDDP precursors. For example, the precursor liposomes may be incubated with the salt solution at 4-10° C. overnight, or at 4-80° C. for at least 1-48 h followed by cooling or letting stand at room temperature to stabilize the structure of the liposome composition. The resulting liposome composition may be purified by filtration to remove excess salts, and exchanged into $ddH_2O$ or any suitable buffer for storage.

In one or more embodiments, the high concentration of the salt solution generates an osmotic pressure that pushes the halogen ions through the lipid bilayer vehicle irreversibly and allows the halogen ions to stay inside of the precursor liposomes, without affecting the stability of the liposome structure. As the halogen ions are being consumed inside the precursor liposomes for API conversion, more halogen ions would continue to diffuse into the precursor liposomes. Such osmosis-based approach presents a cost-effective and time-efficient route for driving drug conversion inside the precursor liposomes.

Figure 2:
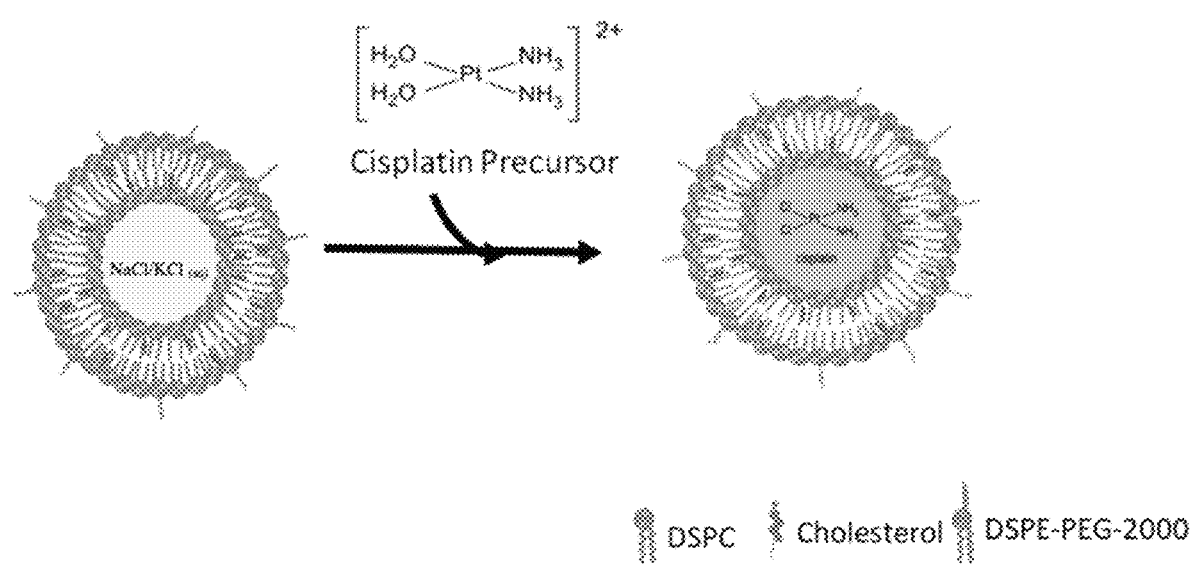
FIG. 2 illustrates a schematic diagram of a preparation of a liposome composition according to an exemplary embodiment of the present disclosure.

Referring to FIG. 2. In a second embodiment, another method for preparing a liposome composition is provided. The method may include the steps of: providing salt liposomes encapsulating salts; and incubating the salt liposomes with platinum-based precursors to allow the platinum-based precursors to enter the salt liposomes and interact with the salts so as to convert the platinum-based precursors to platinum-based drugs to form the liposome composition. Specifically, the salt liposomes may be prepared by adding the salts to a lipid bilayer vehicle to form the salt liposomes. Ingredients and preparation details of the second embodiment are similar to those of the first embodiment.

In the present disclosure, the term "salt liposomes" refers to liposomes that enclose or encapsulates one or more salts (e.g., NaCl or KCl) in an aqueous solution. In the second embodiment, the mole ratio of the salts to the lipid bilayer vehicle may fall within the range of 0.1:1 to 1:1. The salts may be added to the lipid bilayer vehicle at an oil to water (v/v) ratio of 1.5-50:1-4; that is, the volume ratio of the lipid bilayer vehicle to the salts may fall within the range of 1.5-50:1-4. The concentration of the salts added to the lipid bilayer vehicle or in the resulting salt liposomes may fall within a range of 0.1 M to 4 M.

In the second embodiment, the incubation may be carried out at 4-80° C. for 1-48 h to allow the platinum-based precursors to enter the salt liposomes and convert into platinum-based drugs (e.g., CDDPs). For example, the salt liposomes may be incubated with a platinum-based precursor solution at 4-10° C. overnight, followed by cooling or letting stand at room temperature to stabilize the structure of the liposome composition. The resulting liposome composition may be purified by filtration to remove excess precursors, and exchanged into $ddH_2O$ or any suitable buffer for storage.

Figure 3:
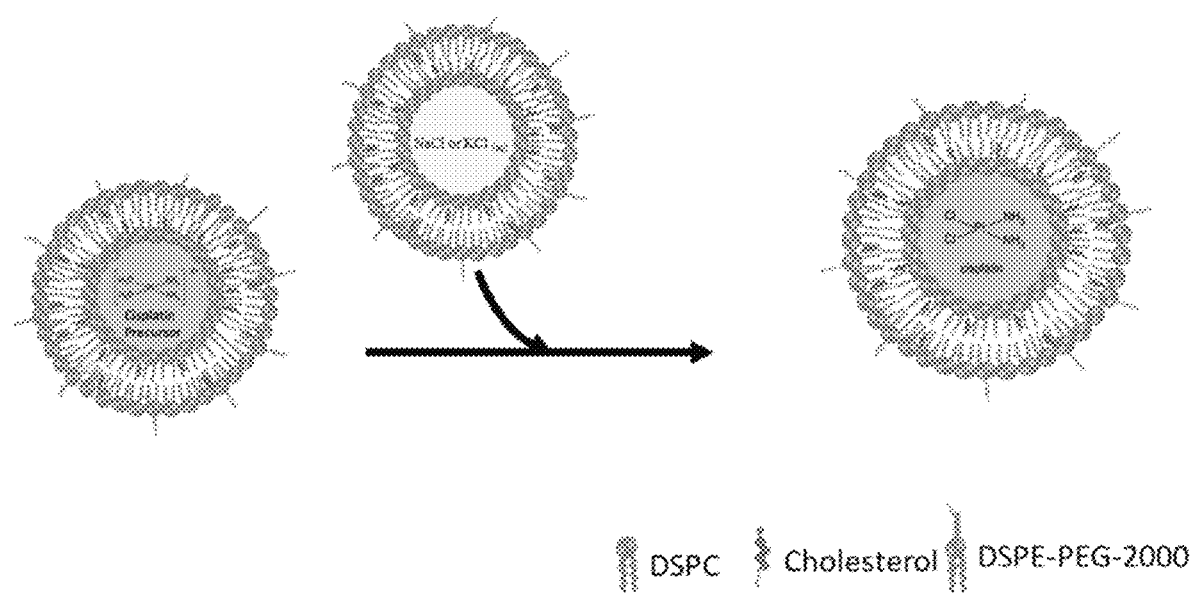
FIG. 3 illustrates a schematic diagram of a preparation of the liposome composition according to an exemplary embodiment of the present disclosure.

Referring to FIG. 3. In a third embodiment, yet another method for preparing the liposome composition is provided. The method may include the steps of: providing precursor liposomes encapsulating platinum-based precursors and providing salt liposomes encapsulating salts; and mixing the precursor liposomes and the salt liposomes to convert the platinum-based precursors to platinum-based drugs to form the liposome composition. Specifically, the precursor liposomes may be prepared by the steps of: hydrating the platinum-based drugs to form the platinum-based precursors; and adding the platinum-based precursors to a lipid bilayer vehicle to form the precursor liposomes. Similarly, the salt liposomes may be prepared by step of: adding the salts to a lipid bilayer vehicle to form the salt liposomes. Ingredients and preparation details of the third embodiment are similar to those of the first embodiment.

In the third embodiment, the mole ratio of the platinum-based drugs to the lipid bilayer vehicle in the precursor liposome may fall within the range of 0.25-1.2:1. In preparation of the precursor liposomes, the CDDP precursors may be added to the lipid bilayer vehicle at an oil to water (v/v) ratio of 1.5-50:1-4; that is, the volume ratio of the lipid bilayer vehicle to the CDDP precursors may fall within the range of 1.5-50:1-4. The concentration of the platinum-based precursors added to the lipid bilayer vehicle or in the resulting precursor liposomes may fall within a range of 10 mM to 600 mM, preferably 1.5 mM to 5 mM. Meanwhile, the salts may include chlorides or bromides. In preparation of the salt liposomes, the mole ratio of the salts to the lipid bilayer vehicle may fall within the range of 0.1:1 to 1:1. The salts may be added to the lipid bilayer vehicle at an oil to water (v/v) ratio of 1.5-50:1-4; that is, the volume ratio of the lipid bilayer vehicle to the salts may fall within the range of 1.5-50:1-4. The concentration of the salts added to the lipid bilayer vehicle or in the resulting salt liposomes may fall within a range of 0.1 M to 4 M.

In the third embodiment, the precursor liposomes and salt liposomes may be mixed at 4-80° C. for 1-48 h to allow the platinum-based precursors to convert into platinum-based drugs (e.g., CDDPs). For example, the precursor liposomes and salt liposomes may be mixed at 4-10° C. overnight, followed by cooling or letting stand at room temperature to stabilize the structure of the liposome composition. The resulting liposome composition may be purified by filtration to remove excess salts and precursors, and exchanged into $ddH_2O$ or any suitable buffer for storage.

Figure 4:
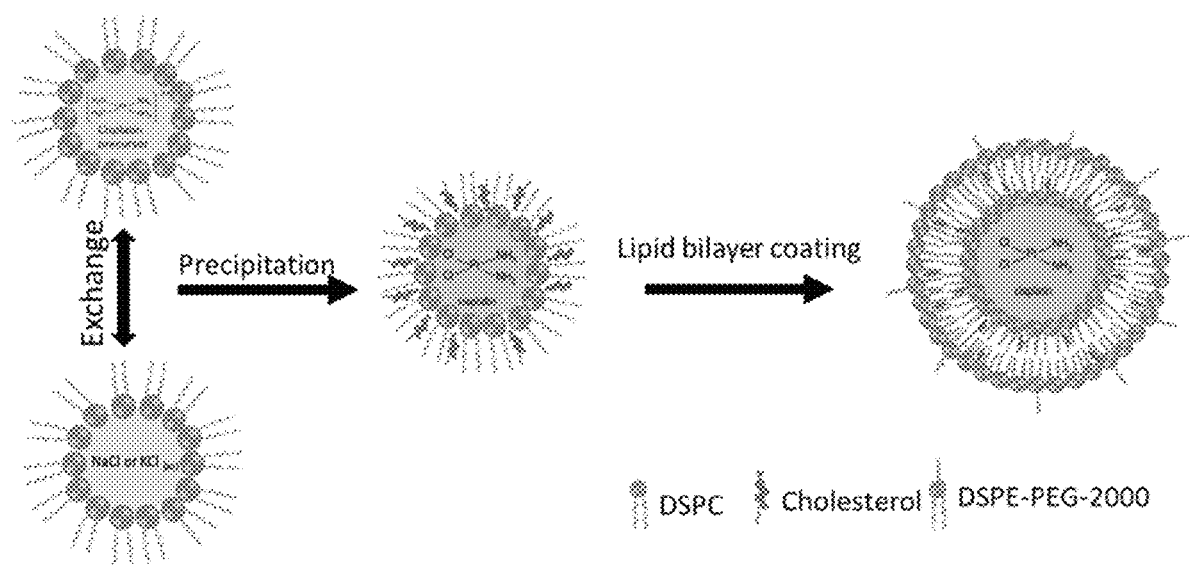
FIG. 4 illustrates a schematic diagram of a preparation of the liposome composition according to an exemplary embodiment of the present disclosure.

Referring to FIG. 4. In a fourth embodiment, still another method for preparing the liposome composition is provided. The method may include the steps of: providing precursor micelles encapsulating platinum-based precursors and providing salt micelles encapsulating salts; mixing the precursor micelles and the salt micelles to convert the platinum-based precursors to platinum-based drugs to form a micelle composition; and mixing the micelle composition with a first lipid-based formulation to form the liposome composition. Specifically, the precursor micelles may be prepared by step of: hydrating the platinum-based drugs to form the platinum-based precursors; and adding the platinum-based precursors to a lipid monolayer vehicle to form the precursor micelles. Similarly, the salt micelles may be prepared by step of: adding the salts to a lipid monolayer vehicle to form the salt micelles. Ingredients and preparation details of the fourth embodiment are similar to those of the first embodiment.

In the present disclosure, the term "micelles" refers to spherical vesicles formed by a single phospholipid layer and capable of enclosing or encapsulating one or more compounds of interest. Therefore, the term "micelle composition" refers to micelles that enclose or encapsulate one or more compounds of interest (e.g., CDDP) in an aqueous solution. The term "precursor micelles" refers to micelles that enclose or encapsulate one or more precursors of the compounds of interest (e.g., monoaqua and/or diaqua forms of CDDP) in an aqueous solution. The term "salt micelles" refers to micelles that enclose or encapsulate one or more salts (e.g., NaCl or KCl) in an aqueous solution.

Figure 5:
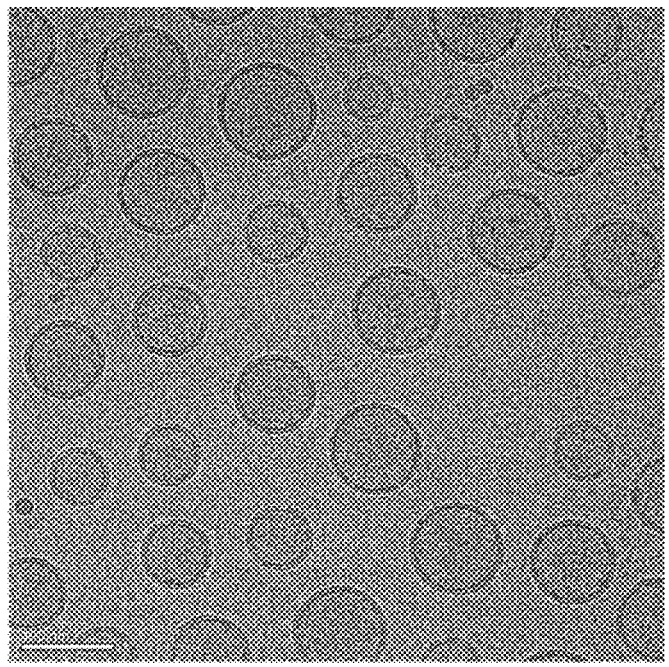
FIG. 5 shows a Cryo-EM image of the liposome composition according to an exemplary embodiment of the present disclosure.

In the fourth embodiment, the first lipid-based formulation may include cholesterol and (m)PEG-conjugated phospholipids. The first lipid-based formulation may be dissolved in an organic solvent (e.g., chloroform or ethanol), and then mixed with the liposome cores at 25-45° C. For example, as illustrated in FIG. 5, after the lipid-based formulation is added, the cholesterol would stabilize the monolayered micelle composition and the DSPE-PEG-2000 would coat the micelle composition to result in the bilayered liposome composition.

The lipid monolayer vehicle may be prepared by mixing a second lipid-based formulation in an organic solvent (e.g., chloroform or ethanol). The second lipid-based formulation may include DSPC and/or other phosphatidylcholines. When chloroform or other oil-based solvent is used, the lipid monolayer vehicle could form immediately therein. In a water-miscible system (e.g., EtOH), heating at 45-60° C. may be required to form the lipid monolayered vehicle.

In the fourth embodiment, the mole ratio of the platinum-based drugs to the lipid monolayer vehicle in the precursor micelles may fall within the range of 0.25-1.2:1. In preparation of the precursor micelles, the CDDP precursors may be added to the lipid monolayer vehicle at an oil to water (v/v) ratio of 1.5-50:1-4; that is, the volume ratio of the lipid monolayer vehicle to the CDDP precursors may fall within the range of 1.5-50:1-4. The concentration of the platinum-based precursors added to the lipid monolayer vehicle or in the resulting precursor micelles may fall within a range of 10 mM to 600 mM, preferably 1.5 mM to 5 mM. Meanwhile, the salts may include chlorides or bromides. In preparation of the salt micelles, the mole ratio of the salts to the lipid monolayer vehicle may fall within the range of 0.1:1 to 1:1. The salts may be added to the lipid monolayer vehicle at an oil to water (v/v) ratio of 1.5-50:1-4; that is, the volume ratio of the lipid monolayer vehicle to the salts may fall within the range of 1.5-50:1-4. The concentration of the salts added to the lipid monolayer vehicle or in the resulting salt micelles may fall within a range of 0.1 M to 4 M.

In the fourth embodiment, the precursor micelles and salt micelles may be mixed at 4-80° C. for 1-48 h to allow the platinum-based precursors to convert into platinum-based drugs (e.g., CDDPs). For example, the precursor micelles and salt micelles may be mixed at 4-10° C. overnight, followed by cooling or letting stand at room temperature to stabilize the structure of the micelle composition. The micelle composition and the resulting liposome composition may be purified by filtration to remove excess salts or precursors, and exchanged into ddH$_2$O or any suitable buffer for storage.

Example

A liposome composition (abbreviated hereunder as LipoCis), in which CDDP is the platinum-based drug encapsulated in a lipid bilayer vehicle made of DSPC, cholesterol, and DSPE-mPEG-2000 ([N-(carbonyl-methoxypolyethylene glycol-2000)-1,2-distearoyl-sn-glycero-3-phosphoethanolamine), was prepared according to the first embodiment of the present disclosure. Specifically, CDDP precursors was obtained by incubating 0.2-0.4 M of CDDP with 0.2-0.5 M of silver nitrate (AgNO$_{3(aq)}$) at 25° C. for 16-48 h or at 60° C. for 1-12 h. Thereafter, the LipoCis was formed firstly by mixing DSPC, cholesterol, and DSPE-PEG-2000 at a weight/volume of solvent ratio of 40-50:15-50:10-30 at 10-60° C. under 100-800 rpm for 10-60 min to form the lipid bilayer vehicle. The CDDP precursors were then added into the lipid bilayer vehicle at an oil-to-water (v/v) ratio of 1.5-50:1-4 by using a micro-volume dropper at 1 mL/min or by bulk mixing followed by either handshaking, mixing or stirring for 15-90 min to form the precursor liposomes.

The liposome encapsulating the CDDP precursors was then homogenized for 1-10 passes to reach a liposome size of 20-250 nm. Finally, the CDDP precursors in the liposomes were converted to CDDPs by incubating the precursor liposomes in 0.2-3.9M of potassium chloride (KCl) or sodium chloride (NaCl) at 4-50° C. and stirring for about 1-48 h. The resulting LipoCis was purified by using a tangential flow filtration (TFF) system to remove excess salts and be exchanged into a 10 mM HEPES, 5% glucose buffer (pH 6.5-7.6), or a 10 mM HEPES, 0.9% saline buffer (pH 6.5-7.6), or a 0.9% saline solution, or a 5% glucose solution, or ddH$_2$O for storage. The drug-to-lipid (D/L) mass loading ratio of the resulting LipoCis was shown to fall within the range of 10% to 80%.

As evidenced by the high conversion rate and drug loading shown in Table 1, the methods of at least the first embodiment of the present disclosure as mentioned above effectively encapsulated and converted the platinum-based precursors to the platinum-based drugs, demonstrating a conversion rate ranging from 90% to 100%. Therefore, drug loading of the liposome composition was calculated to fall within the range of 10% to 80%.

TABLE 1

Drug loading (DL) of LipoCis

| Sample | CDDP Con. (mg/mL) from HPLC | CDDP Con. (mg/ml) from ICP | Conversion (%) | DL (%) |
|---|---|---|---|---|
| LipoCis with NaCl | 0.38 | 0.41 | 93 | 62 |
| LipoCis with KCl | 0.36 | 0.40 | 90 | 62 |

Figure 6:
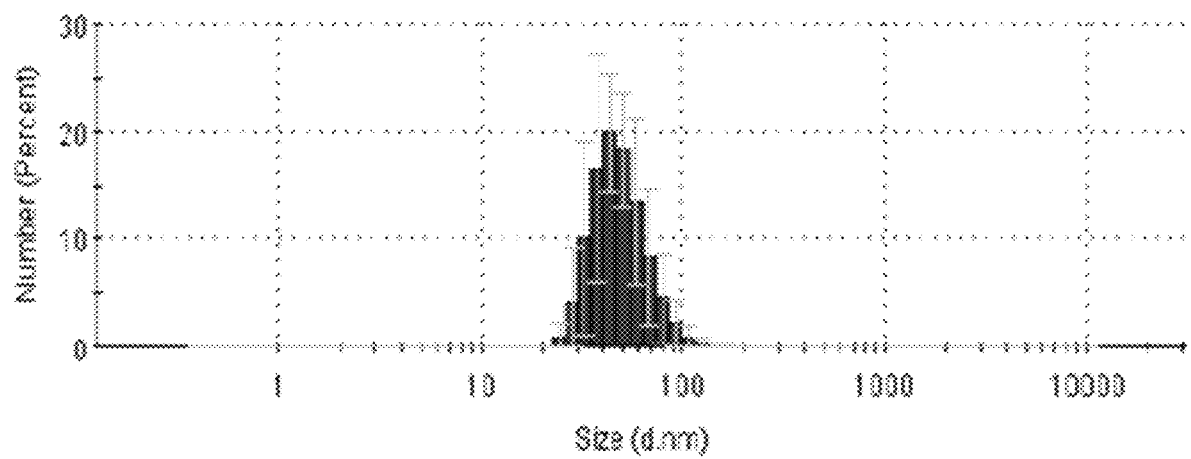
FIG. 6 shows a size distribution of the liposome composition according to an exemplary embodiment of the present disclosure.
Figure 6:
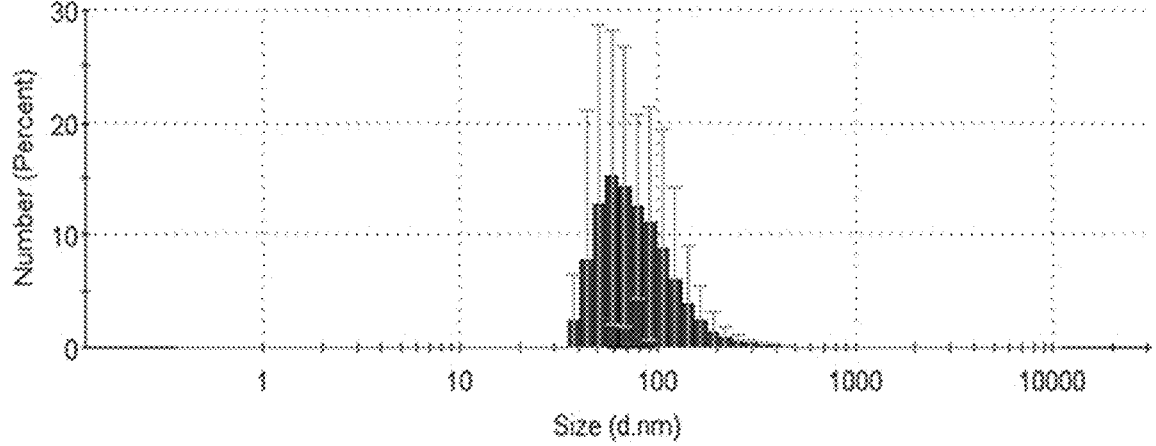

Referring to FIGS. 5 and 6. The LipoCis was in the form of nanoparticles (NPs), which may be characterized by various approaches. In the example shown in FIGS. 5 and 6, particle size and zeta potential were measured using the Malvern Zetasizer Nano series (Westborough, MA, US). Morphology of the LipoCis NPs was captured using cryogenic electron microscopy (Cryo-EM). The amount of CDDP was measured using high performance liquid chromatography (HPLC) and the Pt content in the LipoCis NPs was validated using inductively coupled plasma-atomic emission spectroscopy (ICP-AES) or inductively coupled plasma-optical emission spectrometry (ICP-OES). The excipient concentration was determined using HPLC evaporative light scattering detectors (ELSD). As shown in FIG. 5, the morphology of the LipoCis NPs as captured by Cryo-EM revealed a fine and homogeneous monodispersity, with an approximate particle size in the range 30-150 nm, which is equivalent to that of dynamic light scattering (DLS) measurement. As shown in FIG. 6, all interaction polymer chromatography (IPC) points of the LipoCis NPs were measured.

Figure 7A:
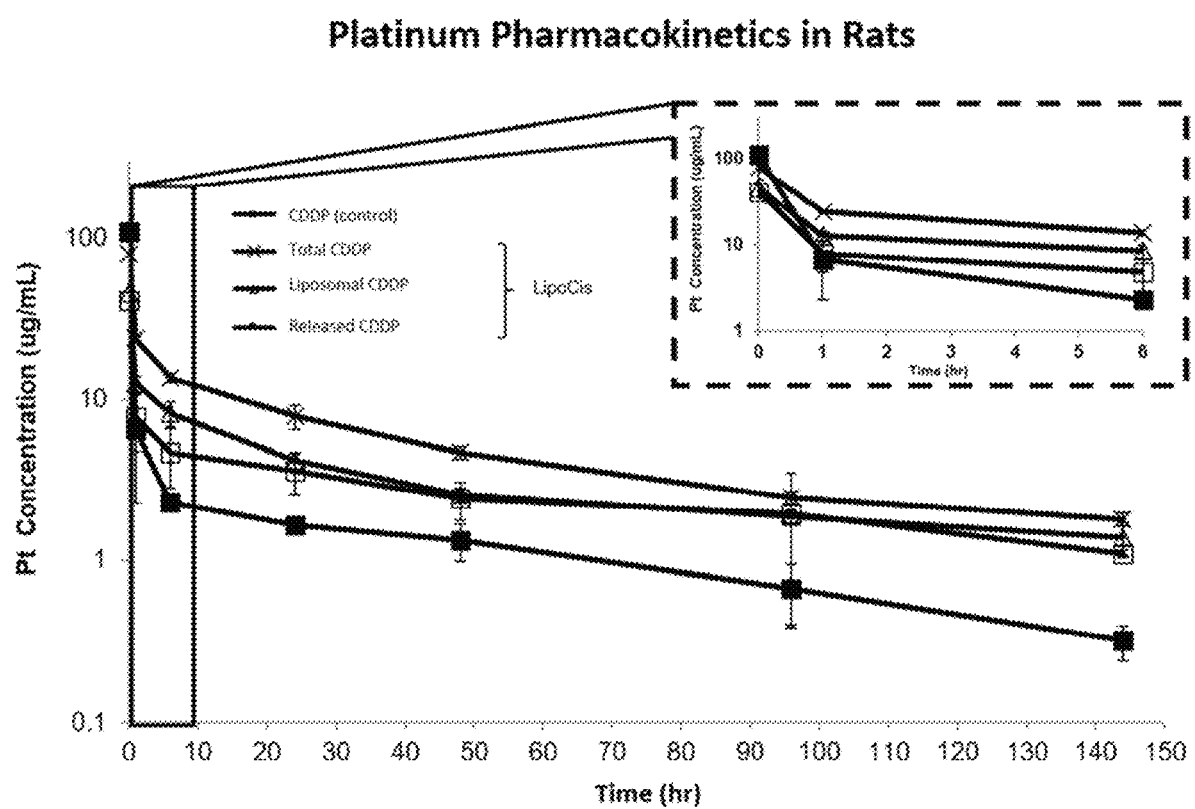

Referring to FIGS. 7A and 7B. Pharmacokinetic analysis of LipoCis in plasma of a SD rat model was performed. In this experiment, eight 10-week-old SD rats were used, and were randomly and evenly divided into 2 groups, a control group and a treatment group. The four rats in the control group were treated with 3 mg of CDDP (conventional unencapsulated cisplatin) per kg of body weight via intravenous infusion at 1 ml/min of infusion rate; whereas, the four rats in the treatment group were treated with 3 mg of LipoCis per kg of body weight via intravenous infusion at 1 ml/min of infusion rate. Blood of the rats were withdrawn and collected at 0 h, 1 h, 6 h, 24 h, 48 h, 96 h, and 144 h. Plasma proteins in the collected blood samples were removed by acetonitrile. Unbroken (unreleased) LipoCis was isolated by filtration and centrifugation. The blood samples were subjected to platinum pharmacokinetics analysis by using ICP-MS (inductively coupled plasma mass spectrometry) to assess the platinum content of CDDP (in the control group) and the platinum contents of total CDDP, liposomal CDDP, and CDDP released from LipoCis (in the treatment group). Specifically, Cmax (peak plasma concentration of drug after administration), CL (In vivo clearance; volume of plasma cleared of the drug per unit time), Vz (apparent volume of distribution during terminal phase), Vss (steady state volume of drug distribution), AUC_last (area under the curve at final blood collection time point), AUC_INF (area under the curve at infinite time point), half-life, MRT_last (mean residence time at final blood collection time point), MRT_INF (mean residence time at infinite time point), and Rsq (regression square data for accuracy) were measured and calculated.

As shown in FIG. 7B, as compared to the control group, the treatment group showed significantly lowered in vivo clearance (CL), increased drug absorption or uptake (as shown by the increased AUC_last and AUC_INF), and longer circulatory time (as shown by the lowered Vss). In other words, the LipoCis exhibited a significantly more sustained in vivo release than unencapsulated CDDP in rats.

Figure 8A:
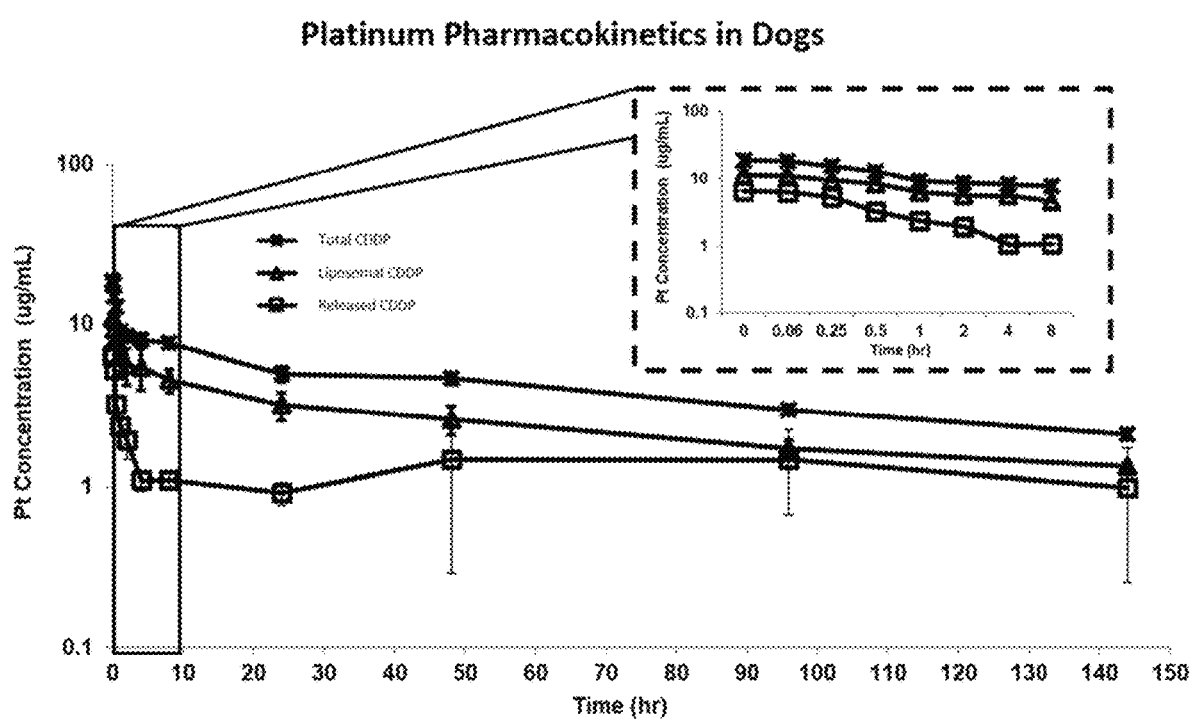

Referring to FIGS. 8A and 8B. Pharmacokinetic analysis of LipoCis in plasma of a dog model was performed. In this experiment, three dogs were treated with 3 mg of LipoCis per kg of body weight via intravenous infusion at 1 ml/min of infusion rate. Blood of the dogs were withdrawn and collected at 0 h, 0.083 h, 0.25 h, 0.5 h, 1 h, 2 h, 4 h, 8 h, 24 h, 48 h, 96 h, and 144 h. Plasma proteins in the collected blood samples were removed by acetonitrile. Unbroken (unreleased) LipoCis was isolated by filtration and centrifugation. The blood samples were subjected to platinum pharmacokinetics analysis by using ICP-MS (inductively coupled plasma mass spectrometry), to assess the platinum contents of total CDDP, liposomal CDDP, and CDDP released from LipoCis. Specifically, Cmax (peak plasma concentration of drug after administration), CL (in vivo clearance), Vz (apparent volume of distribution during terminal phase), Vss (steady state volume of drug distribution), AUC_last (area under the curve at final blood collection time point), AUC_INF (area under the curve at infinite time point), half-life, MRT_last (mean residence time at final blood collection time point), MRT_INF (mean residence time at infinite time point), and Rsq (regression square data for accuracy) were measured and calculated.

As shown in FIG. 8B, the result showed low in vivo clearance (CL), high drug absorption or uptake (as shown by AUC_last and AUC_INF), and long circulatory time (as shown by Vz and Vss). In other words, the LipoCis exhibited a sustained in vivo release in dogs.

To assess the inhibitory potential of the LipoCis NPs on tumor growth, xenograft experiments were conducted for 21 days and the xenograft animal models were monitored daily. In the experiments, human cancer cell lines ($1\times10^6$ cells/in 200 μL PBS-Martigel 1:1 solution) were subcutaneously injected in the right hind legs of Balb/c nude mice. After a considerably sized tumor had appeared, the tumor size was measured daily or every other day and calculated by the formula (length×width×height)/2. When the tumor size reached to the desired size (e.g., 100-210 mm$^3$), the LipoCis NPs were intravenously injected into the tumor-bearing mice once per week for 3 weeks.

To assess the inhibitory potential of the LipoCis NPs on tumor growth, xenograft experiments were conducted for 21 days and the xenograft animal models were monitored daily. In the experiments, human cancer cell lines ($1\times10^6$ cells/in 200 μL PBS-Martigel 1:1 solution) were subcutaneously injected in the right hind legs of Balb/c nude mice. After a considerably sized tumor had appeared, the tumor size was measured daily or every other day and calculated by the formula (length×width×height)/2. When the tumor size reached to the desired size (e.g., 100-210 mm$^3$), the LipoCis NPs were intravenously injected into the tumor-bearing mice once per week for 3 weeks.

Figure 9:
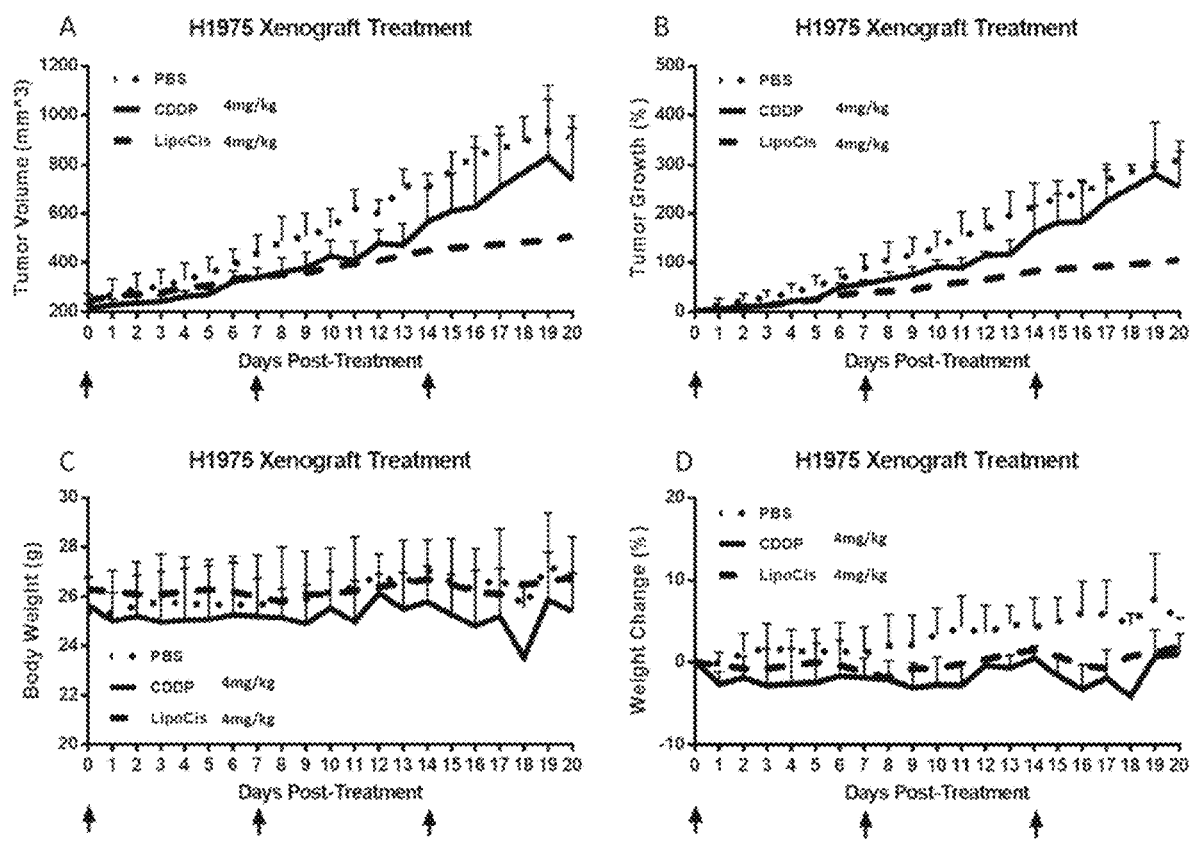
FIG. 9 shows changes in tumor growth and tumor volume of human non-small-cell-lung-cancer (NSCLC) adenocarcinoma H1975 cells xenograft mouse models treated with PBS, CDDP, and LipoCis.
Figure 10:
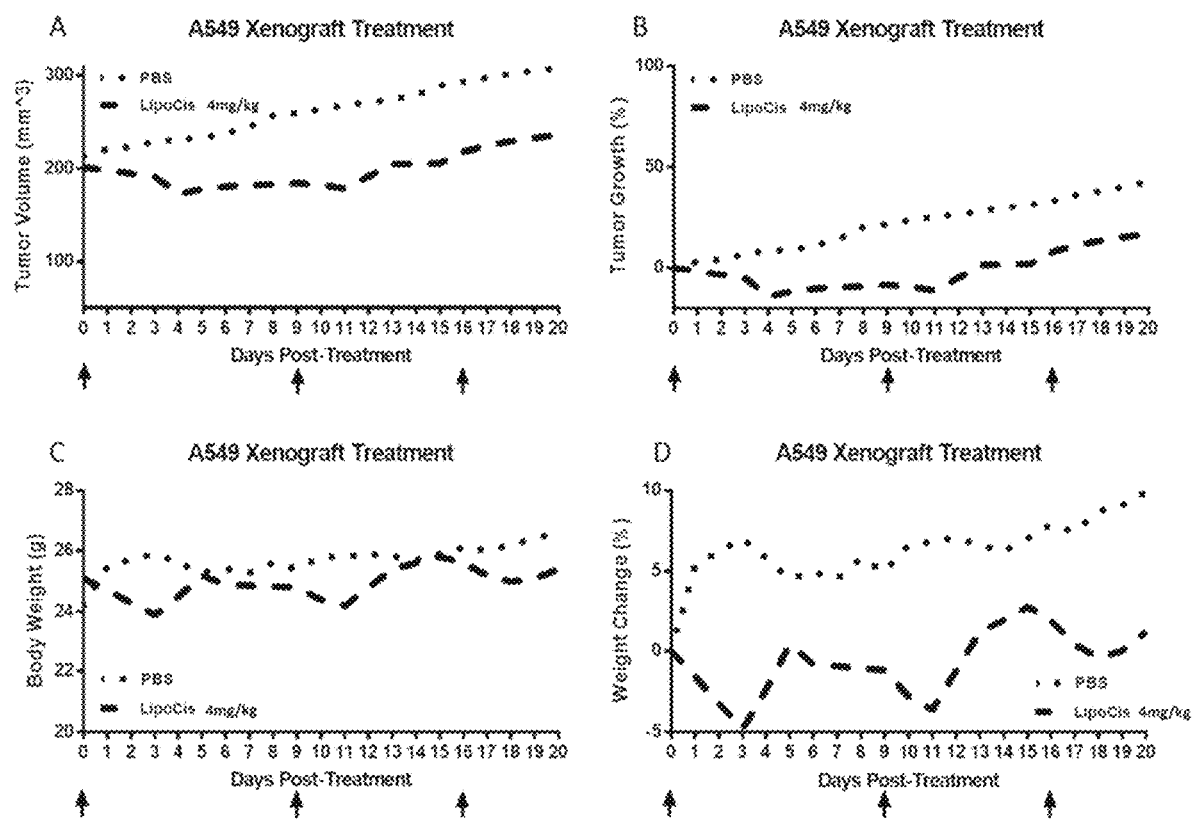
FIG. 10 shows changes in tumor growth, tumor volume and body weight of A549 xenograft mouse models treated with PBS and LipoCis.
Figure 11:
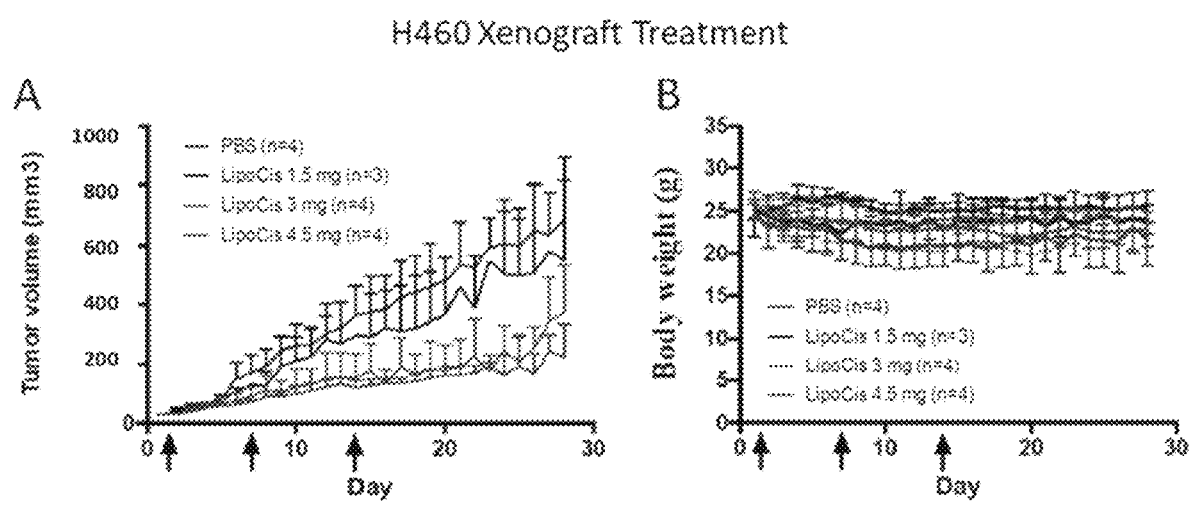
FIG. 11 shows dose-dependent changes in tumor volume, body weight, tumor growth and weight change of lung large cell adenocarcinoma H460 cells xenograft mouse models treated with PBS and LipoCis.

Referring to FIGS. 9 to 11. Three lung cancer cell lines, including human non-small-cell-lung-cancer adenocarcinoma (NSCLC) H1975 cells and A549 cells, and human large cell carcinoma H460 cells, were tested to validate the in vivo efficacy of the LipoCis NPs. As shown in FIG. 9, in the H1975 lung adenocarcinoma cell xenograft mice models, the LipoCis NPs were shown to induce a more significant apoptotic response (by immunostaining studies) as well as stronger tumor inhibitory effects than CDDP. As shown in FIGS. 10 to 11, similar results were also observed in the A549 lung adenocarcinoma cells and H460 lung large cell carcinoma cells xenograft mice models.

Figure 12:
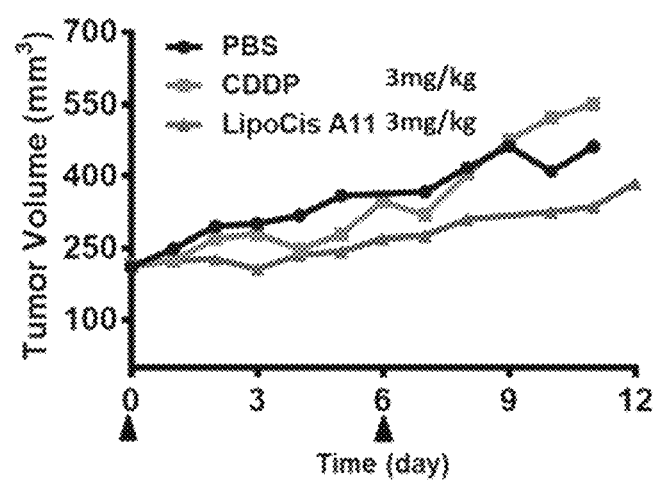
FIG. 12 shows changes in tumor volume of human oral squamous cell carcinoma (HOSCC) SAS cells xenograft mouse models treated with PBS, CDDP, and LipoCis.
Figure 13:
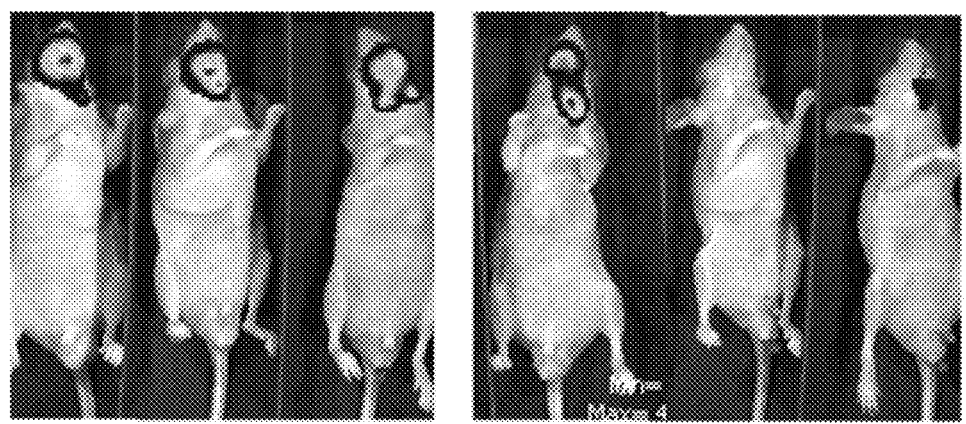
FIG. 13 shows the tumor reduction effect of the liposome composition according to an exemplary embodiment of the present disclosure in the metastatic SAS cells of HOSCC mouse models.
Figure 13:
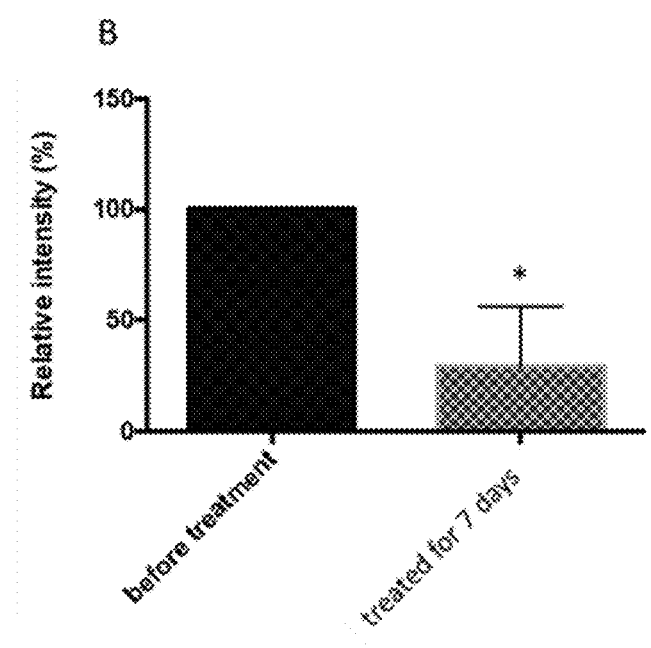

Referring to FIGS. 12 and 13. A human oral squamous cell carcinoma (HOSCC) xenograft animal model was also established. 160 μL of $5\times10^6$ SAS human oral cancer cells in the presence of 200 μL matrigel (Corning, Bedford, MA) were subcutaneously injected using a 28-gauge needle at the lower right dorsal flank of 7 to 9-week-old male BALB/cAnN.Cg-Foxn1nu nude mouse (from National Laboratory Animal Center, Taipei, Taiwan). The SAS xenograft mice were randomly separated into three groups and treated with (i) phosphate-buffered saline (PBS); (ii) CDDP; and (iii) LipoCis NPs. All of the treatments were administered intravenously. The CDDP or LipoCis NPs were given at a similar dose of 3.0 mg/kg. The treatment procedure was carried out when tumors reached 200.1±3.5 mm$^3$ (or 195-210 mm$^3$). Tumor volume was determined as length×width×high×0.5. The mice were sacrificed on the 12th day. Excised tumors and organs were dissected and fixed in 10% formalin for further experiments. These studies were approved and carried out in strict accordance with the recommendations in the Guide for the Care and Use of the Institutional Animal Care and Use Committee of Chung Yuan Christian University, Chungli, Taoyuan, Taiwan, ROC.

To examine the efficacy of the LipoCis NPs in vivo, the SAS human oral tumor-bearing xenograft models with 200.1±3.5 mm$^3$ tumor volume were randomly clustered into three different treatment groups, including (i) PBS; (ii) CDDP; and (iii) LipoCis. Each group received two cycles of treatment with a 6-day interval between each cycle. As demonstrated by the results shown in FIGS. 12 and 13, LipoCis served a potential implication in growth inhibition of SAS tumors.

According to the embodiments of the present disclosure as mentioned above, the LipoCis provided an effective solution to improving platinum-based drug solubility and encapsulation efficiency by liposomal particles. By using the methods of the embodiments of the present disclosure, the precursor liposomes can be converted to platinum-based drug encapsulating liposomes with ease and at low cost. The methods also provide an effective tool for enhancing drug loading of liposome compositions.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for preparing a liposome composition, comprising steps of:
   providing precursor liposomes encapsulating platinum-based precursors; and
   incubating the precursor liposomes in a salt solution to convert the platinum-based precursors to platinum-based drugs to form the liposome composition;
   wherein the precursor liposomes are prepared by:
   hydrating the platinum-based drugs to form the platinum-based precursors;
   mixing a lipid-based formulation to form a lipid bilayer vehicle; and
   adding the platinum-based precursors to the lipid bilayer vehicle to form the precursor liposomes, wherein the lipid-based formulation comprises DSPC, cholesterol, and a member selected from a group consisting of DSPE-PEG-2000, DSPE-PEG-3000, DSPE-PEG-4000, DSPE-PEG-5000, and DSPE-PEG-10000.

2. The method according to claim 1, wherein a mole ratio of the DSPC, the cholesterol, and the member selected from the group consisting of DSPE-PEG-2000, DSPE-PEG-3000, DSPE-PEG-4000, DSPE-PEG-5000, and DSPE-PEG-10000 falls within a range of 5-15:5-15:0.5-10.

3. The method according to claim 1, wherein the platinum-based drugs are hydrated by incubating the platinum-based drugs with at least one compound selected from a group consisting of $AgNO_3$, $Ag_2SO_4$, $Ag_3PO_4$, $Ca(NO_3)_2$, $CaSO_4$, $Ca_3(PO_4)_2$, $Mg(NO_3)_2$, $MgSO_4$, and $MgHPO_4$.

4. The method according to claim 1, wherein the lipid-based formulation is mixed in an organic solvent comprising chloroform or ethanol.

5. The method according to claim 1, wherein a volume ratio of the lipid bilayer vehicle to the platinum-based precursors falls within a range of 1.5-50:1-4.

6. The method according to claim 1, wherein a mole ratio of the platinum-based drugs to the lipid bilayer vehicle falls within a range of 0.25-1.2:1.

7. The method according to claim 1, wherein the platinum-based precursors are added to the lipid bilayer vehicle at an oil to water (v/v) ratio falling within a range of 1.5-50:1-4.

8. The method according to claim 1, wherein the platinum-based drugs comprise at least one platinum-halides bond.

9. The method according to claim 1, wherein the platinum-based drugs are selected from a group consisting of cisplatin, triplatin, phenanthriplatin, picoplatin, and satraplatin.

10. The method according to claim 1, wherein the platinum-based precursors are at least one of monoaqua and diaqua forms of the platinum-based drugs.

11. The method according to claim 1, wherein the salt solution comprises chlorides or bromides.

12. The method according to claim 1, wherein a concentration of the platinum-based precursors in the precursor liposomes falls within a range of 10 mM to 600 mM.

13. The method according to claim 1, wherein a concentration of the salt solution incubated with the precursor liposomes falls within a range of 0.1 M to 4 M.

14. The method according to claim 1, wherein the precursor liposomes are incubated with the salt solution at 4-80° C. for 1-48 h.

* * * * *